May 28, 1968 W. B. BANKS 3,385,104
MASS PRESENCE SENSING APPARATUS

Filed March 3, 1966 3 Sheets-Sheet 1

William B. Banks
INVENTOR.

BY
ATTORNEYS

William B. Banks
INVENTOR.

ATTORNEYS

May 28, 1968  W. B. BANKS  3,385,104
MASS PRESENCE SENSING APPARATUS
Filed March 3, 1966  3 Sheets-Sheet 3
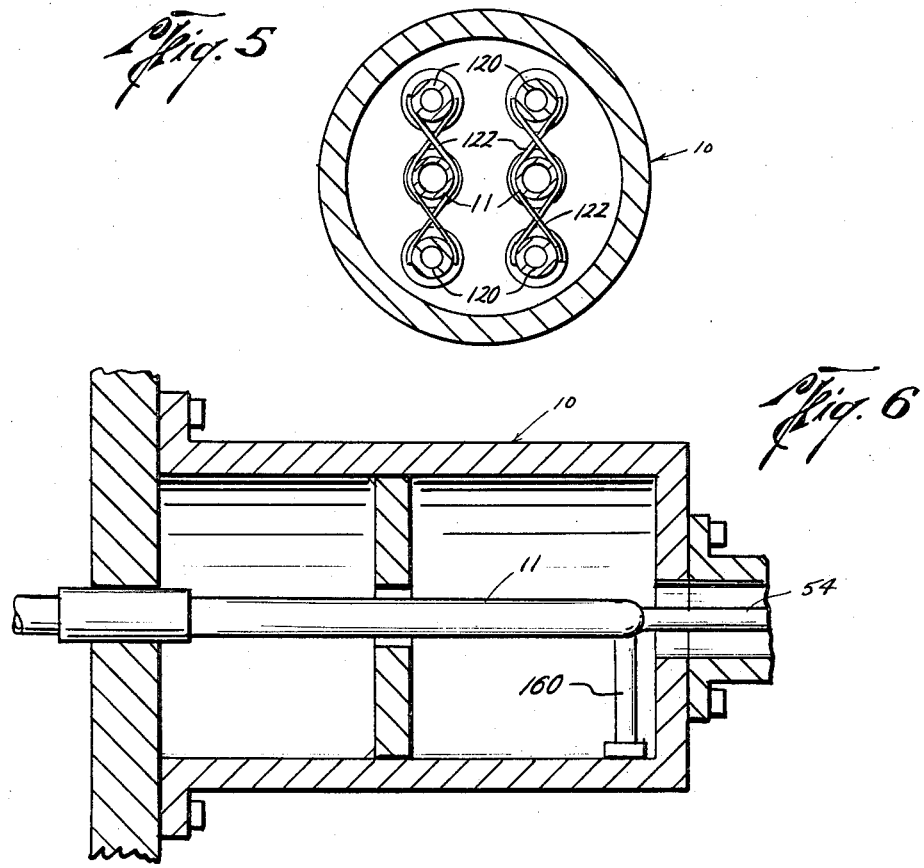
Fig. 5
Fig. 6
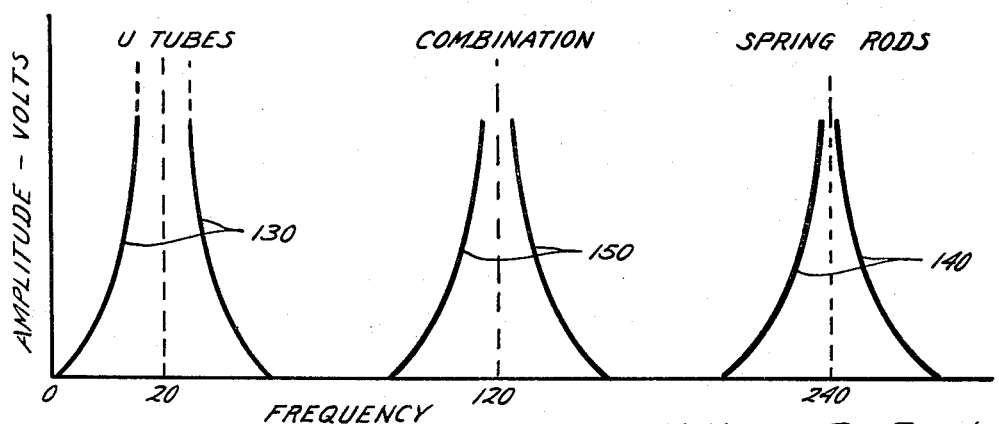
Fig. 7
William B. Banks
INVENTOR.
BY
ATTORNEYS United States Patent Office 3,385,104
Patented May 28, 1968

3,385,104
MASS PRESENCE SENSING APPARATUS
William B. Banks, Houston, Tex., assignor to Automation Products, Inc., Houston, Tex., a corporation of Texas
Continuation-in-part of application Ser. No. 381,610, July 6, 1964. This application Mar. 3, 1966, Ser. No. 531,641
12 Claims. (Cl. 73—67.2)

ABSTRACT OF THE DISCLOSURE

A spring frequency compensating means for use with a vibratory mass presence sensing apparatus and which has first and second ends, the first end of which is connected to and vibrates with the body and the second end which is securely supported for vibration about the second end whereby the frequency compensating means acts as part of the vibration system but is less affected by environmental conditions which change the natural frequency of the body. A spring frequency compensating means, which is positioned out of contact with and thus unaffected by the material to be measured, for connection to a vibrating mass presence sensing apparatus for reducing the effects of environmental conditions wherein the spring compensating means has a higher natural resonant frequency than the vibrating body, such as by means of a length substantially shorter than the body and may include one or more compensating means. A mass presence sensing apparatus for flowing materials having a vibrating U-shaped body wherein a frequency compensating means is connected adjacent the free end of the body and is positioned parallel to the plane of the body.

---

Figure 1:
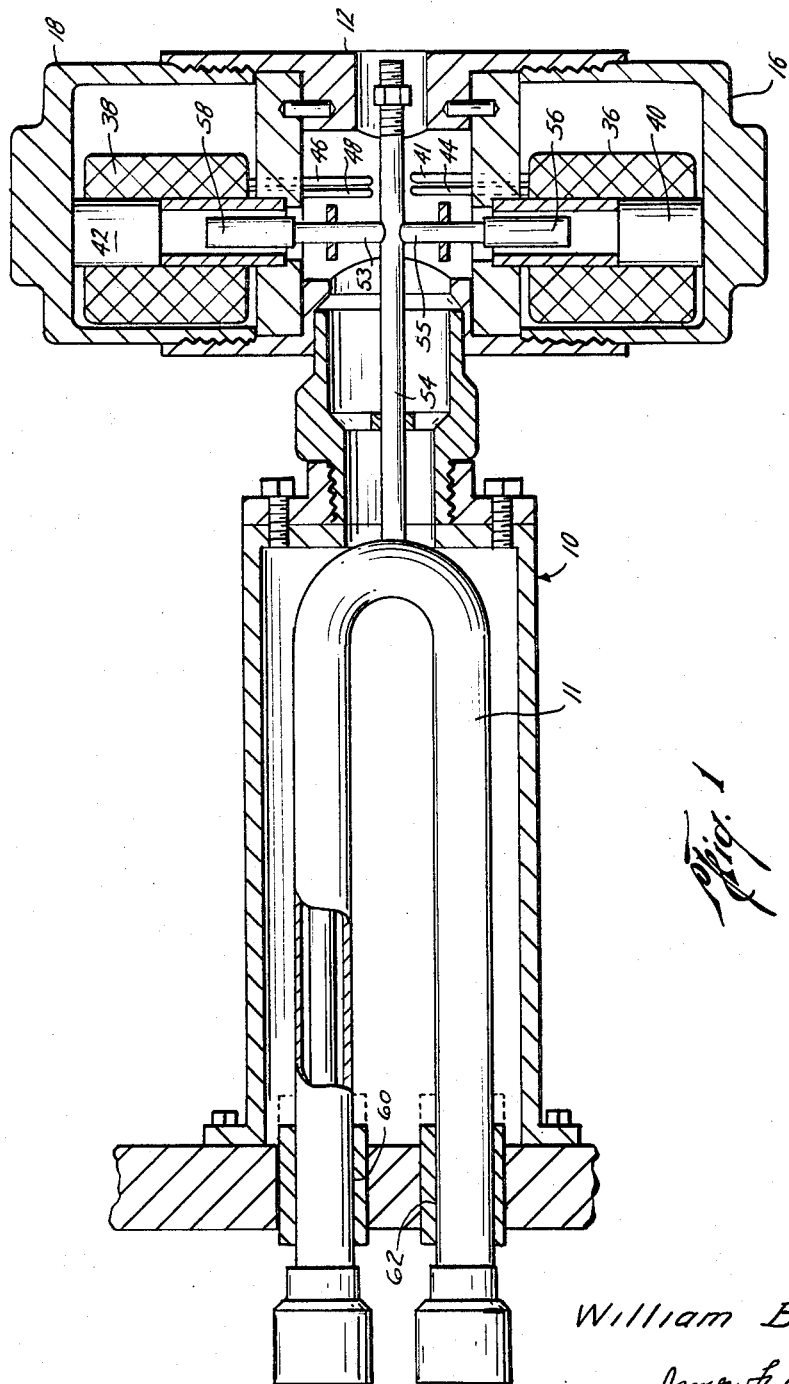

This application is a continuation-in-part of my co-pending patent application, Ser. No. 381,610, filed July 6, 1964, having the same title, now Patent No. 3,339,400. The present invention relates to a mass presence sensing apparatus, and more particularly, to a vibrating hollow body which receives fluent materials for determining the value or changes in the physical mass characteristics of the fluent material and which is suitably compensated to reduce the effects of conditions other than those being measured.

As described in my above named patent application, a vibrating hollow body, such as a U-tube, is capable of wide general application in connection with the measurement of physical properties of materials such as density, weight, specific gravity and measurement of material level and is particularly useful in measuring the physical properties of fluent materials and can be used with liquids, gases, and flowable solids. However, in some instances conditions other than the property being measured affect the measuring instrument thereby providing an erroneous output reading. For instance, a change in temperature, corrosion, or wear will change the modulus of elasticity of the fluid conducting body and will change its frequency of vibration thereby causing an erroneous signal.

It is, therefore, a general object of the present invention to provide a vibratory material conducting mass presence sensing device which is compensated to reduce the effect of changes and conditions other than the physical property of the material being measured.

It is still a further object of the present invention to provide a vibrating hollow body mass presence sensing apparatus which is suitably compensated to reduce the effects of conditions, such as temperature, corrosion and wear, which will affect the sensitivity of the measuring instrument.

Yet a further object of the present invention is the provision of a vibrating U-tube mass presence measuring instrument whereby a wide variety of materials may be used for the U-tube by providing frequency compensating means which is connected to the U-tube and which is affected to a lesser degree than the U-tube by environmental changes so as to provide a total vibrating system which will be responsive to changes in mass but which will be affected only slightly by environmental changes.

Yet a still further object of the present invention is the provision of a frequency compensating spring bar means which is connected to a hollow body vibrating mass presence sensing device and which has a higher natural resonant frequency than the hollow body so that the total vibrating system resonant frequency is largely dependent upon the compensating means whereby the hollow body which conducts the fluid being measured may be made of a wide variety of materials but the spring compensating means will not be in contact with the process, temperature or corrosiveness of the material being measured, and the total vibrating system will accurately measure changes in the mass of the materials without being substantially affected by environmental changes.

A still further object of the present invention is the provision of a U-shaped vibrating detecting instrument which is connected to a temperature compensating means of a constant temperature modulus alloy in which the compensating means has a higher natural resonant frequency than the U-shaped body so that the total vibrating system resonant frequency is largely dependent upon the temperature compensating means which is not exposed to the material being measured but which allows the U-tube to be constructed of a suitable type material to handle the media being measured.

Still a further object of the present invention is the provision of a compensating means for a vibratory body receiving a material to be measured wherein the compensating means is of a length shorter than the body and include a plurality of spring bars positioned parallel to the plane of the body, and are of a constant temperature modulus alloy, and of a higher natural resonant frequency, one end of which is connected to the vibrating body and the other end which is securely positioned for vibration about the other end.

A still further object of the present invention is the provision of a hollow body for conducting flowing material in which the body is vibrated at a fixed frequency and the change in vibration of the body is measured to detect changes in the mass of the material and providing an elongate compensating means having a higher natural resonant frequency than the body connected to the body, the body and the compensating means being supported adjacent their node points and the natural resonant frequency of the body and the compensating means being near the fixed frequency of operation.

Figure 2:
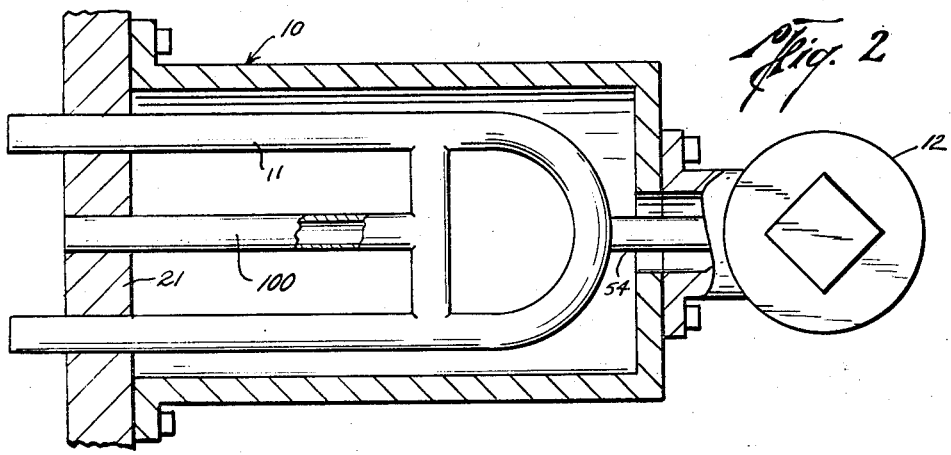
Figure 3:
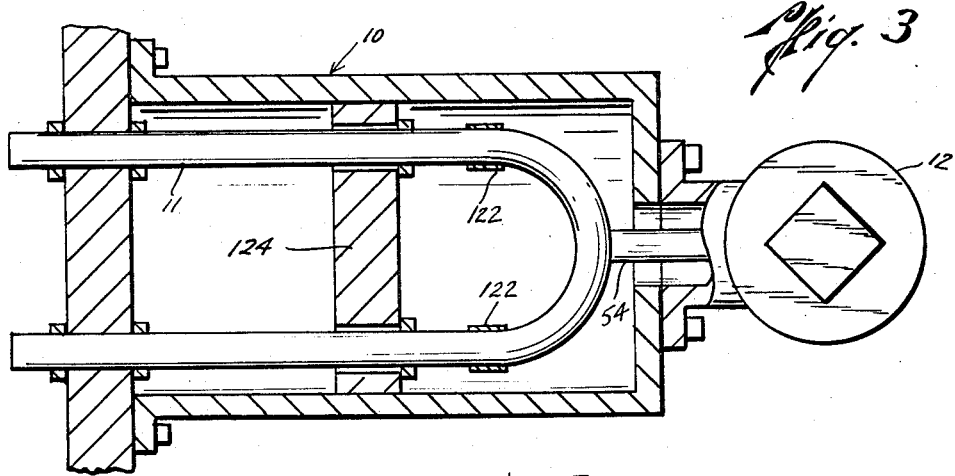
Figure 4:
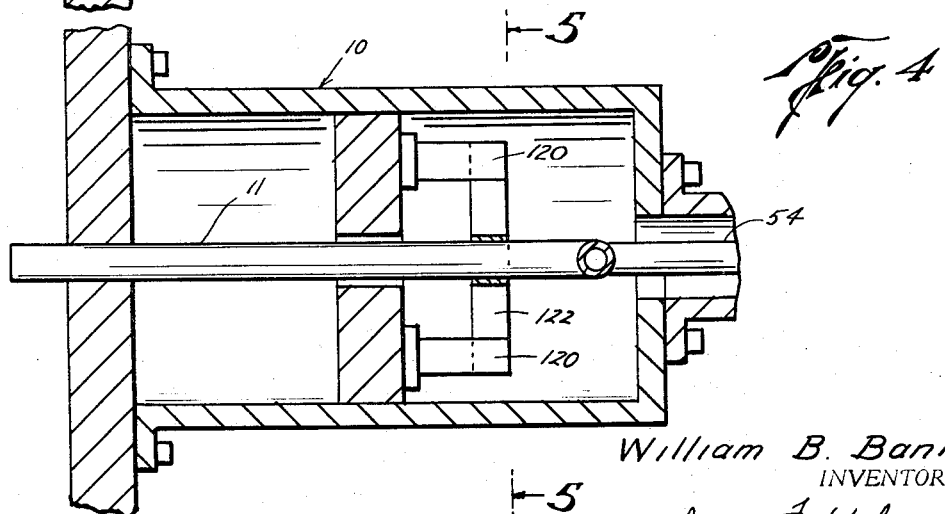

Other and further objects, features and advantages will be apparent from the following description of presently preferred embodiments of the invention, given for the purpose of disclosure, and taken in conjunction with the accompanying drawings, where like character references designate like parts throughout the several views, and where:

FIGURE 1 is an elevational view, partly in section illustrating one form of a vibrating hollow body for measuring changes in the mass of fluent material flowing therethrough, FIGURE 2 is a side elevational view, partly in section, illustrating one form of a compensating apparatus of the present invention for use with the structure of FIGURE 1, FIGURE 3 is a front elevational view, partly in section, illustrating the preferred form of the compensating apparatus of the present invention, used with the structure of FIGURE 1, FIGURE 4 is a side elevational view, partly in section, of the apparatus of FIGURE 3, FIGURE 5 is a cross-section view taken along the lines 5—5 of FIGURE 4, FIGURE 6 is an elevational view, partly in section, illustrating still another form of the compensating apparatus of the present invention, and FIGURE 7 is a graph illustrating the operating characteristics of the components of the vibrating measuring instrument and the combination thereof.

Referring now to the drawings, and particularly to FIGURE 1, the reference numeral 10 generally designates one type of apparatus for determining the value or change in the mass of a flowing material as is more fully described in my above named co-pending patent application. The apparatus 10 generally includes means for vibrating a body 11 and means for detecting the amplitude of vibration of the hollow body 11 through which the material being measured is flowed. The vibration means and the vibration detecting means may be enclosed in a housing 12 having tubular end portions 16 and 18.

The motor or drive vibration means assembly is enclosed in the end 16 and includes an electromagnetic coil 36 and a magnetic core 40. Electrical connections 41 and 44 supply electrical current from an external source to the electromagnetic coil 36 which sets up vibrations in a vibratory armature 56 which in turn is connected to an arm 55 attached to a rod 54 which is connected to and vibrates the hollow body 11 at the frequency of the external applied source.

The vibration detecting means may be a natural frequency detecting means such as shown in my Patent No. 3,349,604, but in the preferred embodiment is an amplitude detecting means or generator assembly is located in the housing end portion 18 and includes a permanent magnet 42 disposed within an electromagnetic coil 38. Rod 54 also includes an arm 53 which supports a magnetic armature 58 which vibrates and induces a voltage in coil 38 which is indicative of the amplitude of vibration of the body 11. Connected to the electromagnetic coil 38 are electrical connections 46 and 48 which carry the signal generated in the detecting coil 38 to suitable electrical indicating or control means such as control relays or indicating voltmeters (not shown) which can be used to control the mass of the material or indicate the value or change in the mass property of the material being measured.

Thus, the armatures 56 and 58 are physically connected to the hollow body 11 and when the armature 56 is vibrated in response to an electrical signal applied to the electrical conductors 41 and 44, the body 11 and the material passing through the body will vibrate in accordance with that signal. Furthermore, the amplitude measuring armature 58 will also vibrate in response to the vibration of the body 11 and induce a signal in electrical conductors 46 and 48 which is proportional to the amplitude of vibration of the body 11. To prevent blocking of the vibrations in the body 11, the body 11 is supported at points 60 and 62 which are near the node points of the natural resonant frequency of the body 11. Thus, the value or changes in the mass of the material which passes through the hollow body 11 affect the amplitude of vibration of the hollow body 11 which is transmitted to and is measured by the amplitude detecting armature 58. While the direction of vibration shown in FIGURE 1 is in the plane of the U-shaped body 11, it is generally preferred that the U-shaped body 11 be vibrated perpendicular to the plane of the body.

However, other factors may affect the amplitude of vibration of the vibrating hollow tube 11 other than a change in the physical property of the material being measured. For instance, a change in the temperature will affect the modulus of elasticity of the vibrating body 11 which in turn will change its natural resonant frequency and thus its amplitude of vibration which provides a signal which gives an erroneous reading. Similarly, the changes in the body 11 such as corrosion and wear will affect the signal output of the apparatus 10. Therefore, it is desirable to provide a vibrating system whose resonant frequency will be responsive to the mass of the material in the hollow body 11, but which will reduce the effects of other changes in the hollow body such as due to conditions such as temperature, corrosion or physical changes in the hollow body itself. Thus, referring now to FIGURE 2, frequency compensating means 100 may be provided having one end connected to the support structure 12 and which is shaped in the form of a T with the ends of the T connected to the legs of the U-shaped body 11. Preferably the compensating means 100 is made of a constant modulus metal alloy such as sold under the trade name of Ni-span-c or Iso-elastic thereby reducing the effects of temperature change on the compensating means 100. However, it is not necessary for compensating means 100 to be of a constant modulus alloy as the compensating means is not subjected to the process temperature of the material as much as the body 11. Thus, on a change of temperature, while the natural resonant frequency of the body 11 will change, there will be a smaller percentage effect due to the temperature changes because of the support of the compensating means 100 which vibrates with and supports the body 11. Furthermore, the compensating means 100 is not contacted by the material being measured and thus will not be subjected to any corrosive or abrasive effect.

However, the square of the nature resonant frequency of a vibrating body is proportional to $$D^4 E / W L^3 \qquad \text{(Equation 1)}$$

where D is the diameter of the rod, E is the modulus of elasticity, W is the weight of the rod including the material, and L is the length of the rod.

From the above named relationship it is therefore noted that the temperature compensating spring bar 100 of FIGURE 2, assuming that it is of substantially the same length size, and cross section as the legs of the U-shaped body 11, and is a single member as compared to the two legs will reduce the effect of temperature changes by factor of only approximately one-third.

However, if the natural resonant frequency of the compensating means is made sufficiently high as compared to the natural resonant frequency of the hollow body, the combined system, when vibrated, will have such a natural resonant frequency so that undesired changes in the natural resonant frequency of the hollow body 11 will not have any substantial effect on the natural resonant frequency of the combined vibration system. From Equation 1 the factors contributing to a change in the ratio of the square of the natural resonant frequency of the body to the compensator is as follows:

$$\frac{F_b^2}{F_c^2} = \frac{D_b^4 E_b W_c L_c^3}{D_c^4 E_c W_b L_b^3} \qquad \text{(Equation 2)}$$

From Equation 2 it is noted that the ratio of the square of natural resonant frequencies of the body to the compensator varies inversely as the cube of their lengths. Since the factor being measured is proportional to W, then the stability also varies inversely as the cube of the lengths. Therefore, one way of increasing ratio between the natural resonant frequency of the body and the compensator is to provide a plurality of compensating bars of lengths substantially shorter than the legs of the body 11. Thus, referring to FIGURES 3, 4 and 5, a plurality of spring compensating means such as four bars 120 (not seen in FIGURE 3) may be provided having one end thereof securely fastened to the body 11 remote from the points of vibration, the node points 60 and 62, such as by connectors 122 and the second ends of the bars being securely supported for vibration of the bars 120 about a support 124. The second ends of the bars 120 are supported adjacent a node point of their natural resonant frequency for preventing blocking of the vibration of the body 11. Thus, the spring compensating bars 120 will vibrate with the body 11 and will combine with the body 11 to provide a single vibrating system. Of course, as indicated by Equation 2, other properties of the vibrating components such as the modulus of elasticity or the diameter may be varied in order to provide a compensator having a high resonant frequency as compared with the resonant frequency of the body 11, the structure of FIG-URES 3–5 provide a system in which the body 11 may be long and flexible as compared with the compensating bar to provide a sensitive device. Of course, as indicated from Equation 1, the frequency compensation of the bars 120 may be increased if the diameter of the compensating bars 120 is larger in diameter than the legs of the body 11, is shorter than the legs, has a higher modulus of elasticity, the bars 120 are solid in cross section, or their number is increased, all of which will increase their natural resonant frequency.

Referring now to FIGURE 7, typical characteristic output curves are shown wherein the amplitude of vibration or output signal in volts of the various components and their combination are shown relative to the frequency of vibration. Assuming for purposes of illustration only, that the natural resonant frequency of the body 11 is 20 cycles per second, the response curve for the body 11 is indicated by the graph 130. Assuming that the natural resonant frequency of the spring compensators 120 is 240 cycles per second their response characteristic is indicated by the graph 140. And the combination system, that is the combination of the body 11 along with the spring compensators 120 would result in a vibration system having a natural resonant frequency of 120 cycles per second which would provide the response graph 150. Therefore, it is noted that the response graph 150 will be subjected to only a very small change due to environmental changes as compared with the graph 130 for the body 11 only. Thus, the use of the compensators make it possible so that the body 11 may be made of a wide variety of materials, for instance, stainless steel, carbon steel, tantalum, glass, copper and other materials of the desired type depending upon the characteristics of the material flowing through the measuring body 11. It is also noted that the compensating bars 120 are not exposed to the process material, its temperature, corrosive characteristic, or abrasion. Therefore, changes in the temperature, corrosion and other physical structure alterations of the body 11 will have a greatly reduced effect on the output signal of the apparatus 10 since the natural resonant frequency of the total vibrating system is largely dependent upon the spring compensators and is not solely dependent on the change in the natural resonant frequency of the body 11.

The advantage of the compensating system shown in FIGURES 3, 4 and 5, as compared to FIGURE 2, may be more readily illustrated by assuming that the bars 120 are one-third of the length of the legs of the body 11 and assuming that the spring compensators 120 are of the same diameter, weight, cross section and modulus of elasticity as the legs, and assuming that the readout of the apparatus is proportional to the square of the resonant frequencies $F_b^2/F_c^2$, then by Equation 2 the ratio of the square of the resonant frequency of the two legs of the body 11 as compared to the ratio of the resonant frequency of the spring compensators 120 is $1/54$. That is, the ratio of the square of the natural resonant frequencies of the body 11 to the frequency compensators 120 varies inversely as the cube of their lengths and with the assumptions heretomade, Equation 2 becomes:

$$\frac{F_b^2}{F_c^2} = \frac{L_c^3}{L_b^3} \quad \text{(Equation 3)}$$

and for the structure of FIGURES 3, 4, and 5 becomes $$\frac{F_b^2}{F_c^2} = \frac{(1/3)^3}{1} = \frac{1}{27}$$

and since there are four frequency compensator bars 120 and only two legs to the body 11 the compensated factor becomes $1/54$ as the readout of apparatus 10, for changes in the density of the material flowing through the body 11 is proportional to the square of the resonant frequencies. Thus, it is seen that the effect of changes in the square of the natural resonant frequency of the body 11 such as caused by corrosion, temperature, or abrasion has only $1/54$ of the effect on the combined vibrating system as it would have on the natural resonant frequency of the body 11 itself. Thus, tantalum and stainless steel, for instance, whose modulus of elasticity varies greatly with temperature can be used for the body 11 to convey corrosive materials, but the system including compensators, as a whole, is less affected by environmental changes than the body 11 by itself. Therefore, the embodiment of FIGURE 2 in order to have the resonant frequency effect ratio of FIG-URES 3–5 would require 108 of the spring compensators 100 as compared to the four shorter spring compensators 120 of FIGURES 3–5.

While FIGURES 2–5 disclose the spring compensators as being parallel to the plane of the vibrating body 11, FIGURE 6 illustrates another modification where a spring compensator 160 is perpendicular to the plane of the body 11, having one end connected to the body 11, and the second end being fixedly supported. The compensator 160 in this position will have a very high natural resonant frequency and generally only a single spring bar is required.

In use, and referring to FIGURE 1, a suitable electric source is connected by the electrical conductors 41 and 44 to the electromagnetic coil 36 which constitutes the vibration means by which the hollow body 11 is caused to vibrate. When the electromagnetic coil 36 is energized by an alternating current, the vibration armature 56 is attached and released so as to cause the connecting rod 54 to vibrate at the frequency of the applied electrical source. The frequency of vibration is near the natural resonant frequency of the entire system of the body 11 and the compensators so as to operate, for example, on the response graph 150 of FIGURE 7. Thus, the vibration of the connecting arm is transmitted to the hollow body 11. In turn, the vibration of the hollow body 11 and the material flowing therethrough is transmitted back up to the rod 54 to the amplitude vibrating armature 58. Electromagnetic or pickup coil 38 thus generates a voltage caused by the vibration of the armature 58 in the magnetic field of the magnet 42. The signal from this detector or pickup coil 38 is transmitted through the electrical conductors 46 and 48 to any suitable type of electrical circuit having electrical indicating or control means (not shown). The value or change in the mass of the material which passes through the hollow body 11 affects the amplitude of the vibration of the hollow body 11 which is reflected and transmitted to the amplitude detecting armature 58. The operating characteristics of the body 11 alone is given by the curves 130 in FIGURE 7 as amplitude or volts vs. frequency. However, since the natural resonant frequency of the body 11 will vary with temperature abrasion, corrosion and other effects such as caused by the material passing therethrough, its natural resonant freqency and therefore its operating characteristic as shown in graph 130 will change. However, by utilizing a spring compensating means such as 100 in FIGURE 2, 120 in FIGURES 3, 4 and 5, and 160 in FIGURE 6, which are not affected by the material flowing through the body 11, these effects will have a smaller percentage effect on the operating characteristic of the combination vibration system as shown by the curve 150 in FIGURE 7.

The present invention therefore is well adapted to carry out the objects and attain the ends and advantages mentioned as well as others inherent therein. While presently preferred embodiments of the invention are given for the purpose of disclosure, numerous changes in the details of construction, and arrangement of parts will readily suggest themselves to those skilled in the art and which are encompassed within the spirit of the invention and the scope of the appended claims.

What is claimed is:

1. A vibratory, material conducting, mass presence sensing device, which is compensated to reduce the effects of changes and conditions other than the physical property of the material being measured comprising:
   a vibrating hollow body for conducting said flowing material,
   support means supporting the body adjacent a node point of the natural resonant frequency of the body,
   elongate spring frequency compensating means positioned out of contact with the material for reducing natural frequency changes caused by the effect of changes and conditions other than the physical property of the material being measured having first and second ends, the first end of which is connected to and vibrates with said body, and the second end being securely supported adjacent a node point of said elongate means thereby reducing the effect of changes in the natural resonant frequency of the body and the spring compensating means having a higher natural resonant frequency than the body whereby the natural resonant frequency of the body and the connected compensating means is substantially dependent on the compensating means,
   vibration means connected to and vibrating the body and compensating means adjacent their combined natural resonant frequency, and
   vibration detection means connected to the body for detecting a change in the vibration of the body caused by the physical property of the material being measured.

2. The apparatus of claim 1 wherein the spring compensating means is of a length substantially shorter than the body.

3. The apparatus of claim 1 wherein said spring compensating means first end is connected adjacent the free end of the body and the second end is securely supported at a position closer to the free end of the body than said body support means.

4. The apparatus of claim 1 wherein said spring compensating means is substantially perpendicular to the plane of the body and including connecting means securing the compensating means to said body.

5. The apparatus of claim 1 wherein said spring compensating means includes a plurality of elongate spring bars, said bars being of a substantially shorter length than the body, and positioned substantially parallel to the plane of the body.

6. The apparatus of claim 1 wherein said compensating means is of a constant temperature modulus material.

7. In a vibratory mass presence sensing apparatus for flowing material having a vibrating hollow body for conducting said flowing material, support means supporting the body adjacent the node points of the natural resonant frequency of the body, the combination with the above of:
   elongate spring frequency compensating means positioned out of contact with the material for reducing natural resonant frequency changes caused by the effect of changes and conditions other than the physical property of the material being measured, said means having a higher natural resonant frequency than the body, said means being of a length substantially shorter than the body and having first and second ends, the first end thereof being connected to the body remote from the body support means and vibrating with the body and the second end being securely supported for vibration about the second end whereby the natural resonant frequency of the body and the connected compensating means is substantially dependent on the compensating means,
   vibration means connected to and vibrating the body and compensating means adjacent their combined natural resonant frequency, and
   vibration detection means connected to the body for detecting a change in the vibration of the body caused by the physical property of the material being measured.

8. In a vibratory mass presence sensing apparatus for flowing material having a vibrating U-shaped hollow body for conducting the flowing material, support means supporting the legs of the body adjacent the node points of the natural resonant frequency of the body, the combination of the above of:
   a plurality of elongate spring compensating bars for reducing natural frequency changes caused by the effect of changes and conditions other than the physical property of the material being measured, said bars having a higher natural resonant frequency than the body, having first and second ends, the first end thereof being connected to the body remote from the node points and the second end being securely supported adjacent the node point of said bars,
   vibration means connected to and vibrating the body and compensating bars near their combined natural resonant frequency, and
   vibration detection means connected to the body for detecting a change in the vibration of the body caused by the physical property of the material being measured.

9. A vibratory, material conducting, mass presence sensing device, which is compensated to reduce changes and conditions other than the physical property of the material being measured comprising:
   a U-shaped vibrating hollow body for conducting said flowing material,
   support means supporting the legs of the body adjacent a node point of the natural resonant frequency of the body,
   vibration means connected to and vibrating the body at a fixed frequency,
   vibration detection means connected to the body for detecting a change in the vibration of the body caused by the physical property of the material being measured,
   elongate frequency compensating means having a higher natural resonant frequency than the body and positioned out of contact with the material, said compensating means being connected to the body remote from the body support means and vibrating with the body and supported adjacent a node point of said compensating means whereby the natural resonant frequency of the body and its connected compensating means is substantially dependent on the compensating means,
   the natural resonant frequency of the body and the compensating being near the frequency of said vibration means.

10. The apparatus of claim 9 wherein said compensating means includes a plurality of elongate spring bars of a substantially shorter length than the legs of the body and positioned substantially parallel to the legs.

11. The apparatus of claim 9 wherein said compensating means is of a constant temperature modulus material.

12. In a vibratory mass presence sensing apparatus for flowing material having a U-shaped vibrating hollow body for conducting said flowing material, support means supporting the legs of the body adjacent a node point of the natural resonant frequency of the body, the combination with the above of:
   elongate spring frequency compensating means positioned out of contact with the material thereby avoiding natural resonant frequency changes caused by the effect of changes and conditions other than the physical property of the material being measured and having first and second ends, the first end thereof being connected to the body remote from the support means and vibrating with the body and the second end being securely supported for vibration about the second end, said compensating means having a higher natural resonant frequency than the body whereby the natural resonant frequency of the body and its connected compensating means is substantial dependent on the frequency compensating means, vibration means connected to and vibrating the body and compensating means near their combined natural resonant frequency, and vibration detection means connected to the body for detecting a change in the vibration of the body caused by the physical property of the material being measured.

References Cited

UNITED STATES PATENTS 2,754,676   7/1956   Poole _____ 73—32

JAMES J. GILL, *Primary Examiner.*

RICHARD C. QUEISSER, *Examiner.*

ROBERT S. SALZMAN, *Assistant Examiner.*